(12) United States Patent
Hasselbrinck et al.

(10) Patent No.: US 8,772,721 B2
(45) Date of Patent: Jul. 8, 2014

(54) OPERATING DEVICE

(71) Applicant: Marquardt GmbH, Rietheim-Weilheim (DE)

(72) Inventors: Ingo Hasselbrinck, Spaichinigen (DE); Stefan Vogel, Brigachtal (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 13/656,950

(22) Filed: Oct. 22, 2012

(65) Prior Publication Data
US 2013/0048857 A1    Feb. 28, 2013

Related U.S. Application Data

(63) Continuation of application No. PCT/EP2011/002040, filed on Apr. 21, 2011.

(30) Foreign Application Priority Data

Apr. 21, 2010 (DE) .......................... 10 2010 017 909

(51) Int. Cl.
*G01J 5/00* (2006.01)
*G06F 3/042* (2006.01)

(52) U.S. Cl.
CPC ...................................... *G06F 3/042* (2013.01)
USPC ..................................................... 250/338.1

(58) Field of Classification Search
CPC ..... G06F 3/042; G06F 3/0421; G06F 3/0428; G06F 3/0412; G11B 2007/0013
USPC ............................................ 250/338.1–338.5
See application file for complete search history.

(56) References Cited

U.S. PATENT DOCUMENTS

| 4,719,455 A | 1/1988 | Louis |
| 5,943,233 A | 8/1999 | Ebina et al. |

(Continued)

FOREIGN PATENT DOCUMENTS

| DE | 100 22 321 A1 | 11/2001 |
| DE | 101 20 691 A1 | 11/2002 |

(Continued)

OTHER PUBLICATIONS

German Search Report dated Apr. 7, 2011.

(Continued)

*Primary Examiner* — Kiho Kim
(74) *Attorney, Agent, or Firm* — Burr & Brown, PLLC (57) ABSTRACT

The invention relates to an operating device for a motor vehicle having a movable activation element for activating at least one switch element for generating a switch signal. The operating device comprises a sensor face which is arranged on the activation element and an optical reflection sensor device, which has at least one light emitting diode and at least one photodiode for optical radiation. A signal can be generated when the sensor face is approached and/or the sensor face is touched, in particular by means of a finger of a user.

10 Claims, 7 Drawing Sheets

(56) References Cited

U.S. PATENT DOCUMENTS

| | | | |
|---|---|---|---|
| 6,337,918 B1 | 1/2002 | Holehan | |
| 7,072,533 B1 | 7/2006 | Krier | |
| 8,269,175 B2 * | 9/2012 | Alameh et al. | 250/349 |
| 2002/0030668 A1 | 3/2002 | Hoshino et al. | |
| 2002/0093481 A1 | 7/2002 | Kehlstadt | |
| 2004/0132498 A1 | 7/2004 | Clabunde et al. | |
| 2004/0174921 A1 * | 9/2004 | Ball | 374/20 |
| 2004/0227625 A1 | 11/2004 | Joehl et al. | |
| 2007/0037611 A1 | 2/2007 | Mori et al. | |
| 2009/0295760 A1 * | 12/2009 | Linge et al. | 345/179 |
| 2011/0184264 A1 * | 7/2011 | Galasso et al. | 600/347 |

FOREIGN PATENT DOCUMENTS

| | | |
|---|---|---|
| DE | 102 28 110 A1 | 1/2004 |
| DE | 103 21 964 B4 | 5/2008 |
| DE | 10 2007 022 526 A1 | 11/2008 |
| DE | 10 2007 026 282 A1 | 1/2009 |
| EP | 1 228 917 A1 | 8/2002 |
| WO | 2007/025858 A1 | 3/2007 |

OTHER PUBLICATIONS

International Search Report dated Jul. 27, 2011.

* cited by examiner

OPERATING DEVICE

CROSS REFERENCE TO RELATED APPLICATIONS

This application is a continuation of International Application No. PCT/EP2011/002040 filed Apr. 21, 2011, which designated the United States, and claims the benefit under 35 USC §119(a)-(d) of German Application No. 10 2010 017 909.4 filed Apr. 21, 2010, the entireties of which are incorporated herein by reference.

FIELD OF THE INVENTION

The invention relates to an operating device.

BACKGROUND OF THE INVENTION

Such operating devices are used in motor vehicles by a user to operate a wide variety of functions.

Such an operating device having a sensor face and having an optical reflection sensor device which has at least one light emitting diode and at least one photodiode for optical radiation is known per se. When an operating element, for example a finger of the user, is made to approach the sensor face and/or the sensor face is touched by means of the operating element, a signal can be generated by means of the sensor device in that the optical radiation which is emitted by the light emitting diode is reflected by the operating element at least partially to the photodiode, and this reflected optical radiation is correspondingly evaluated. Such an operating device therefore operates in the manner of a touchpad.

Furthermore, it is known in motor vehicles to use operating devices of the type of a multi-functional operating element to trigger various functions by the user. Such a multi-functional operating element has a movable operating element which serves to activate at least one electrical switch element. The activated switch element in turn generates an electrical signal which then brings about the triggering of the desired function.

SUMMARY OF THE INVENTION

The invention is based on the object of developing the operating device, in particular of improving the functionality thereof.

The operating device according to the invention has both a touchpad and a multi-functional operating element. In this context, the sensor face is arranged on the activation element, and the touchpad is therefore integrated into the multi-functional operating element. Such an operating device provides the user with extended operating possibilities compared to the conventional separate devices, namely a touchpad and multi-functional operating element. Overall, the functionality of the operating device according to the invention is therefore improved to a high degree.

In a further refinement of the operating device which is embodied as a multi-functional operating element with an activation element, the sensor face is arranged on the activation element in such a way that a direction signal can be generated in the manner of a wind rose, by corresponding operation. The previous pivoting of the activation element in various directions is replaced in this case by approaching and/or touching the corresponding locations on the sensor face. In order still to implement additional operating functions where appropriate, the activation element can be activated by a turn and/or press function. These functions can also be implemented using the sensor face. However, for the sake of simplicity and ergonomy it is suitable here for the user to move the activation element by rotating and/or pressing for the additional operating functions. In this context, the activation element for the additional operating function can act on an electrical switch element in order to generate a corresponding electrical signal.

In an expedient and compact refinement, the multi-functional operating element has a housing. The activation element is movably mounted in the housing and projects out of the housing in order to be operated by the user. In addition, further activation elements, which act on electrical switches, can also be located on the housing. As a result, further functions can be triggered by the user, for example a direct selection of a specific menu can be made on a screen in the motor vehicle.

In order to select various locations on the sensor face and/or in order to permit the operating element to be tracked on the sensor face, the optical reflection sensor device can have a plurality of light emitting diodes and/or a plurality of photodiodes. The light emitting diodes and/or the photodiodes can expediently be arranged in the form of a matrix. This then facilitates the evaluation of the correspondingly generated signal.

It is appropriate for the light emitting diode and/or the photodiode to be located on a printed circuit board, which facilitates the mounting of the operating device. Of course, further electrical and/or electronic components can also be accommodated on the printed circuit board. For example, a microprocessor for evaluating the signals can also be arranged on the printed circuit board. In a compact design, the printed circuit board can be arranged in the activation element.

In another refinement of the operating device according to the invention, the optical radiation has a wavelength which is not in the range of the light which is visible to the human eye. In particular, the optical radiation is infrared radiation. In this case, the optical reflection sensor device has at least one infrared (IR) light emitting diode and/or at least one infrared (IR) photodiode. The sensor face is substantially transparent to the optical radiation and substantially nontransparent to visible light. To the user's eye, the sensor face is therefore nontransparent, as a result of which the sensor device is concealed from the user. A touchpad in the motor vehicle is therefore provided as an operating element, for example for a central operating unit, on the basis of optical light scanning, specifically by means of infrared technology.

The sensor face can expediently have regions which transmit visible light. These regions can be illuminated and therefore have the purpose of displaying symbols, functional displays or the like, but the rest of the surface of the touchpad is advantageously nontransparent. In a compact design it is appropriate here that the sensor face is configured as a label made of a first plastic layer which transmits light, and a second layer which does not transmit light and transmits infrared (IR). For the sake of simple and cost-effective manufacturability, the label can be manufactured as a two-component (2C) part.

For one particularly preferred refinement the following is to be noted. In contrast to a capacitive sensor, it is possible with a sensor based on infrared (IR) to detect an approach to an operating field in order to trigger actions on one level by means of the operating field. At the contact level, further/other functions can be implemented. By means of the arrangement of a plurality of IR diodes and/or IR sensors as a matrix it is also possible to detect the position of a finger, of a pen and/or of a hand in space under a display. Likewise, a movement and/or the speed of movement and/or a direction can be detected. Corresponding actions can then be derived from this. A combination of capacitive sensor on a contact level and IR sensors on an approach level is also possible.

The advantages which are achieved with the invention are, in particular, the fact that a touchpad is provided for operating individual functions in the motor vehicle up to the detection of lettering by means of the finger or similar objects. In contrast to contemporary applications, the touchpad already detects the approach and can therefore be operated on various levels. These optical operating units can detect movements with simple electronic components. In this context, 3D movements can be evaluated on the basis of the received signal with the result that a wide variety of input possibilities are conceivable by means of the operating units. The implementation of a touchpad is therefore advantageously successful specifically in the motor vehicle with an approach function, multitouch function, detection of lettering or the like, wherein the touchpad provides the possibility of operator control on various levels.

BRIEF DESCRIPTION OF THE DRAWINGS

Exemplary embodiments of the invention with various developments and refinements are illustrated in the drawings and will be described in more detail below.

DETAILED DESCRIPTION OF THE INVENTION

Figure 1:
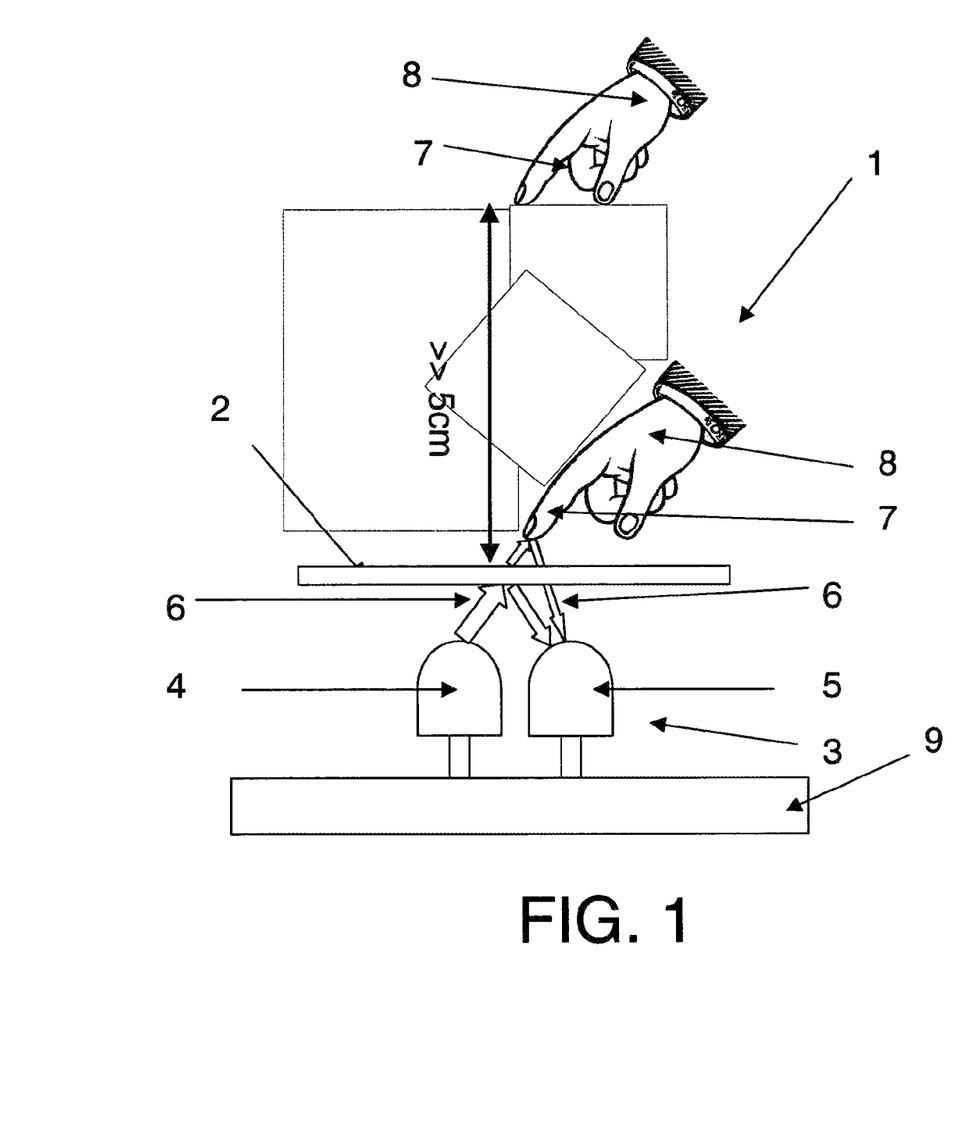
FIG. 1 shows a basic outline of the method of functioning of the operating device.

In FIG. 1, an operating device 1 is shown, in particular for a motor vehicle, having a sensor face 2 and having an optical reflection sensor device 3, as a basic outline. The sensor device 3 has at least one light emitting diode 4 and at least one photodiode 5 for optical radiation 6. When the sensor face 2 is approached and/or the sensor face 2 is touched by means of an operating element, for example here a finger 7 of the hand 8 of a user, a signal can be generated by means of an electronic system 9. In this context, a reflection of the optical radiation 6 by the finger 7 or by the hand 8, in particular the movement thereof, is detected by means of the transmitting diode 4 and the receiving diode 5.

The operating device 1 therefore permits an approach to be detected with respect to the speed and/or the direction of the finger 7. Furthermore, it is possible to detect the finger 7 sliding over from the left to the right or from top to bottom, or vice versa. Finally, a "multipoint" detection is also made possible for rotation by means of two fingers 7. The detection is possible both in the vicinity of the sensor face 2 and in the manner of a far field, for example at a distance of more than 5 cm from the sensor face 2.

Figure 2:
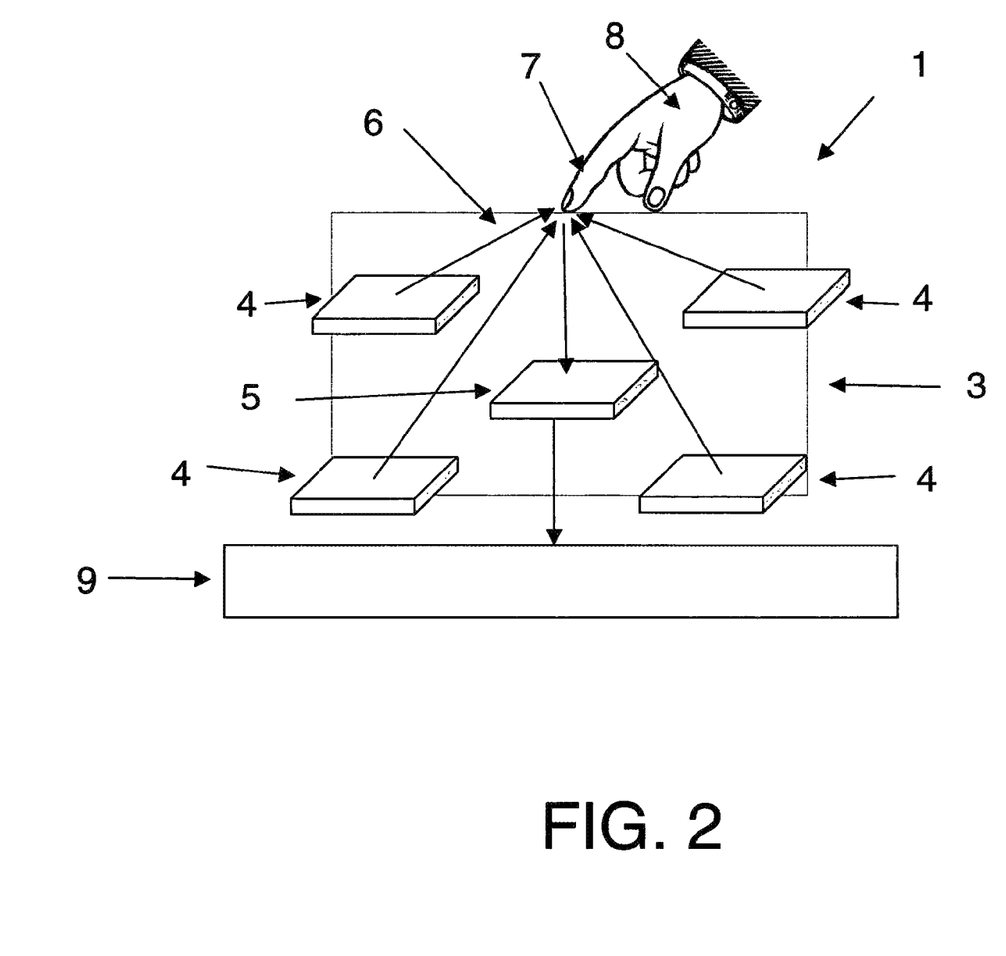
FIG. 2 shows a basic outline of the operating device in a further refinement.

In order to detect complex movements of the finger 7 and/or the hand 8, according to FIG. 2 it is possible to arrange a plurality of transmitting diodes 4 and/or receiving diodes 5.

In this context, a plurality of transmitting diodes 4 are arranged in the form of a matrix in FIG. 2, wherein only one receiving diode 5 interacts with these transmitting diodes 4. Of course, when necessary a plurality of receiving diodes 5 can also be correspondingly provided, which is illustrated in more detail in FIG. 7.

Figure 3:
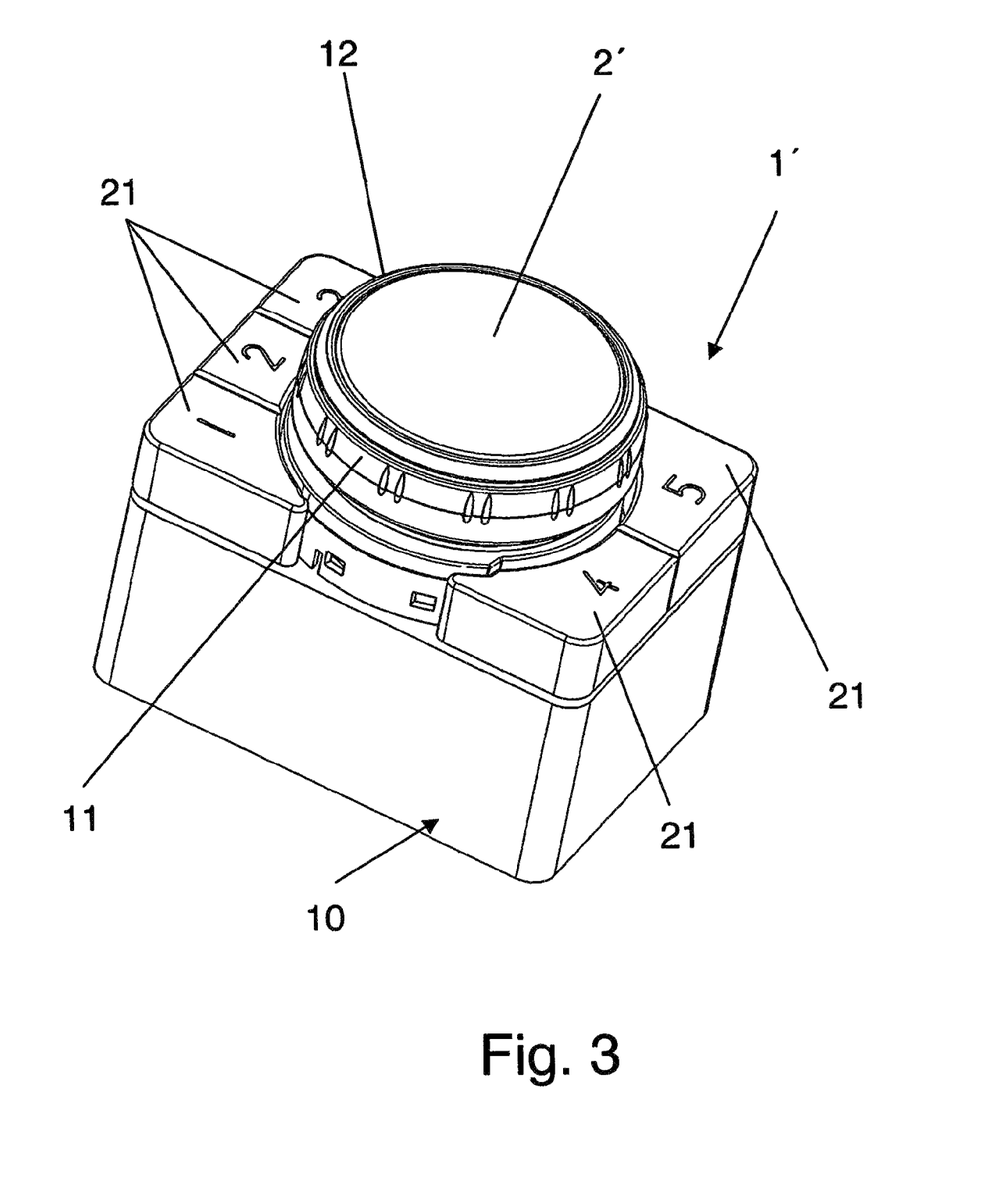
FIG. 3 shows a perspective view of an operating device which is configured as a multi-functional operating element.
Figure 7:
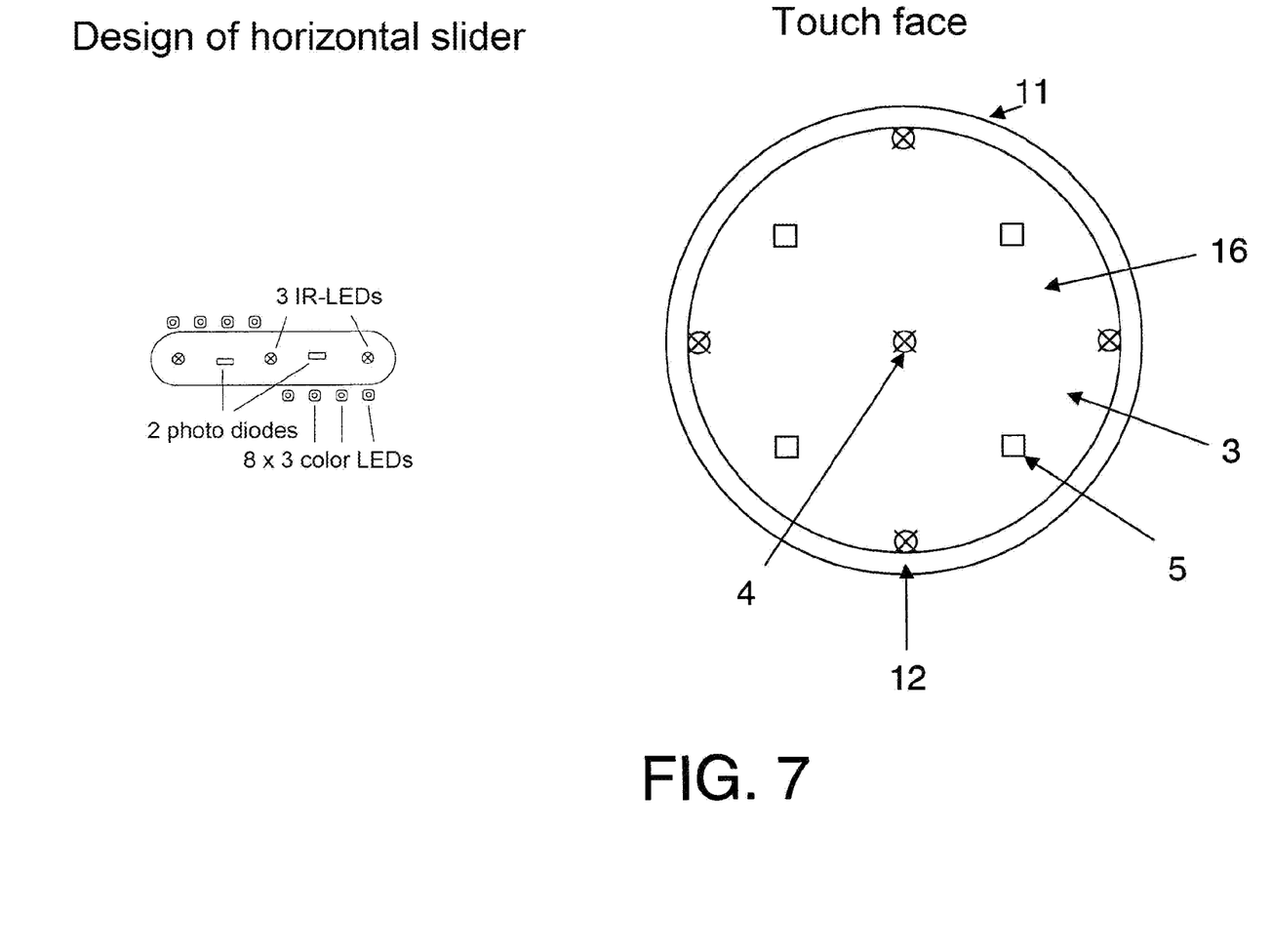
FIG. 7 shows the sensor device in the activation element from FIG. 3.

In FIG. 3, an operating device which is configured as a multi-functional operating element 1' is shown. The multi-functional operating element 1' has a housing 10, out of which an activation element 11 projects in order to be operated by the user. The activation element 11 is movably arranged in the housing 10. In fact, the activation element 11 can be turned and pressed in order to generate corresponding switch signals, specifically a rotation signal and an Enter signal. A label 2' is arranged as a sensor face on the upper side of the activation element 11. The sensor device 3 which can be seen in FIG. 7 is located in the interior of the activation element 11. As a result, when the finger 7 is made to approach the label 2' and/or the label 2' is touched by means of the finger 7, a corresponding signal can be generated, as already described above.

As a result of a corresponding control operation by the user on the label 2', a direction signal can be generated here in the manner of a wind rose. In order to characterize the respective operating locations on the label 2' for the direction signals, according to FIG. 4, corresponding direction arrows 22 are provided there. As already mentioned, the activation element 11 can be moved for additional operating functions by the user performing a turning and/or pressing operation. For the activation of these additional operating functions, the activation element 11 acts on electrical switch elements in order to generate a corresponding electrical signal, as described below.

Figure 4:
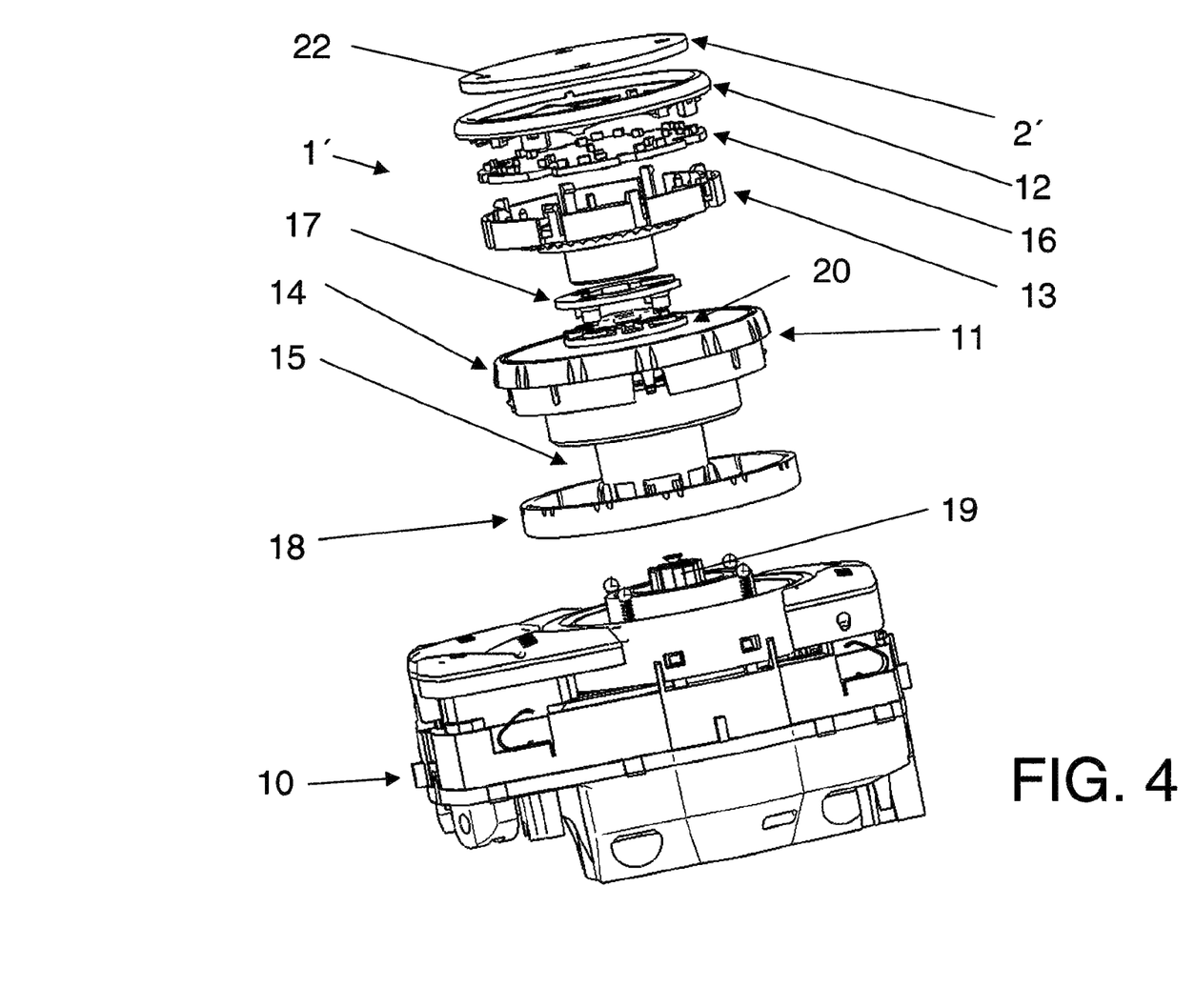
FIG. 4 shows the operating device from FIG. 3 in an exploded illustration.

FIG. 4 shows the more detailed design of the multi-functional operating element 1'. The activation element 11 comprises a light guide 12, for illuminating the latter in the manner of a corona. Furthermore, the activation element 11 has a guide part 13, a chrome ring 14 for the rotational movement, a shaft 15 with a soft component for damping the noise of the movement of the activation element 11 and a guide disk 18. In the housing 10 there is an anti-rotation means 19 for accommodating the activation element 11. A switching mat 17 interacts with a disk 20, which is located in the housing 10 and serves as an opposite pole to the switching mat 17, for the generation of the Enter signal by pressing the activation element 11. In addition to the switching mat 17 which serves as an electrical switch element, in the housing 10 there are further electrical switch elements (not shown in more detail) which serve to generate the electrical switch signals during the rotational movement of the chrome ring 14 on the activation element 11. Of course, instead of electrical switch elements it is also possible to use optical, electro-optical or similar switch elements for generating the switch signals.

Figure 5:
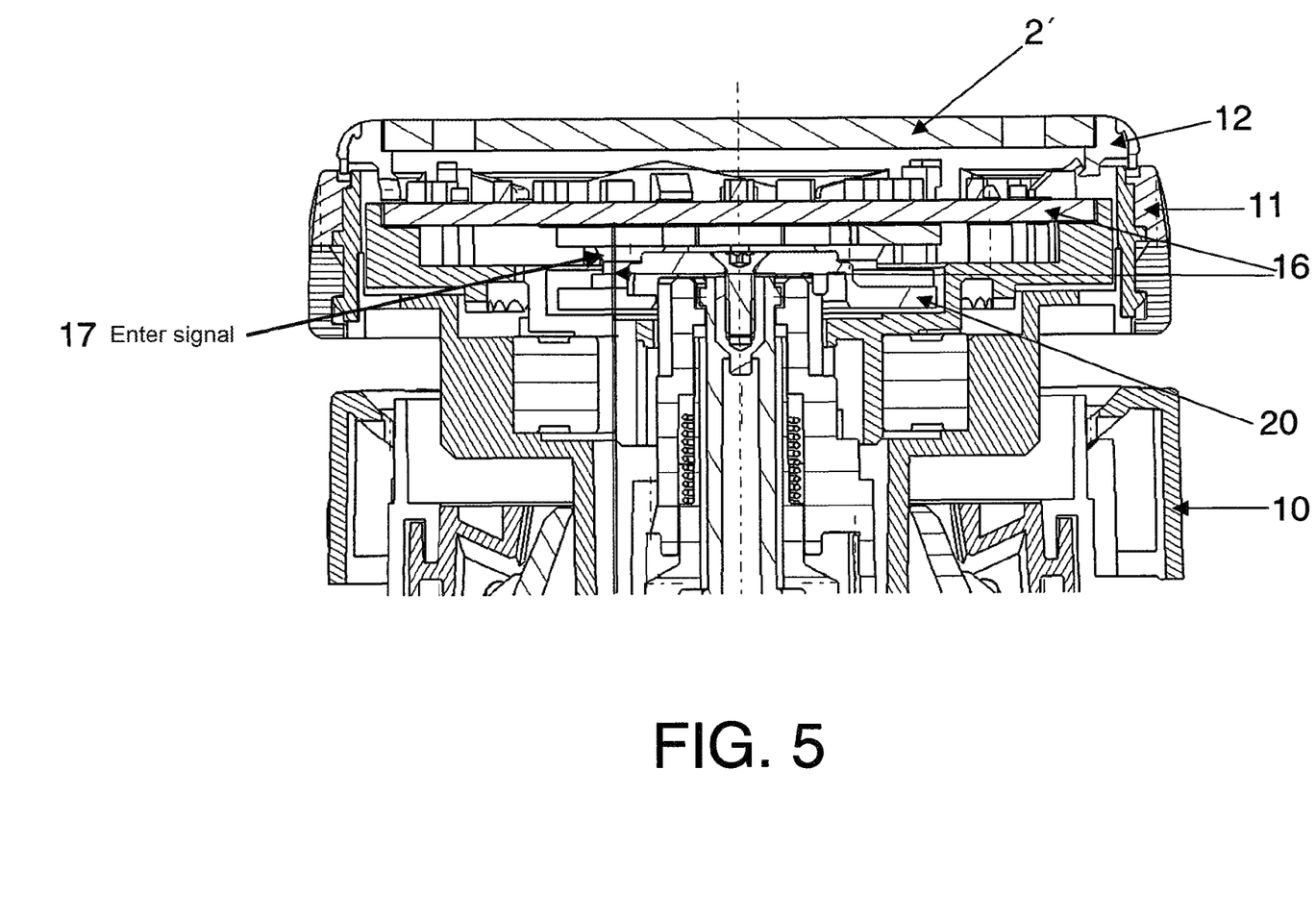
FIG. 5 shows a sectional illustration through the operating element and through part of the housing from FIG. 3.
Figure 6:
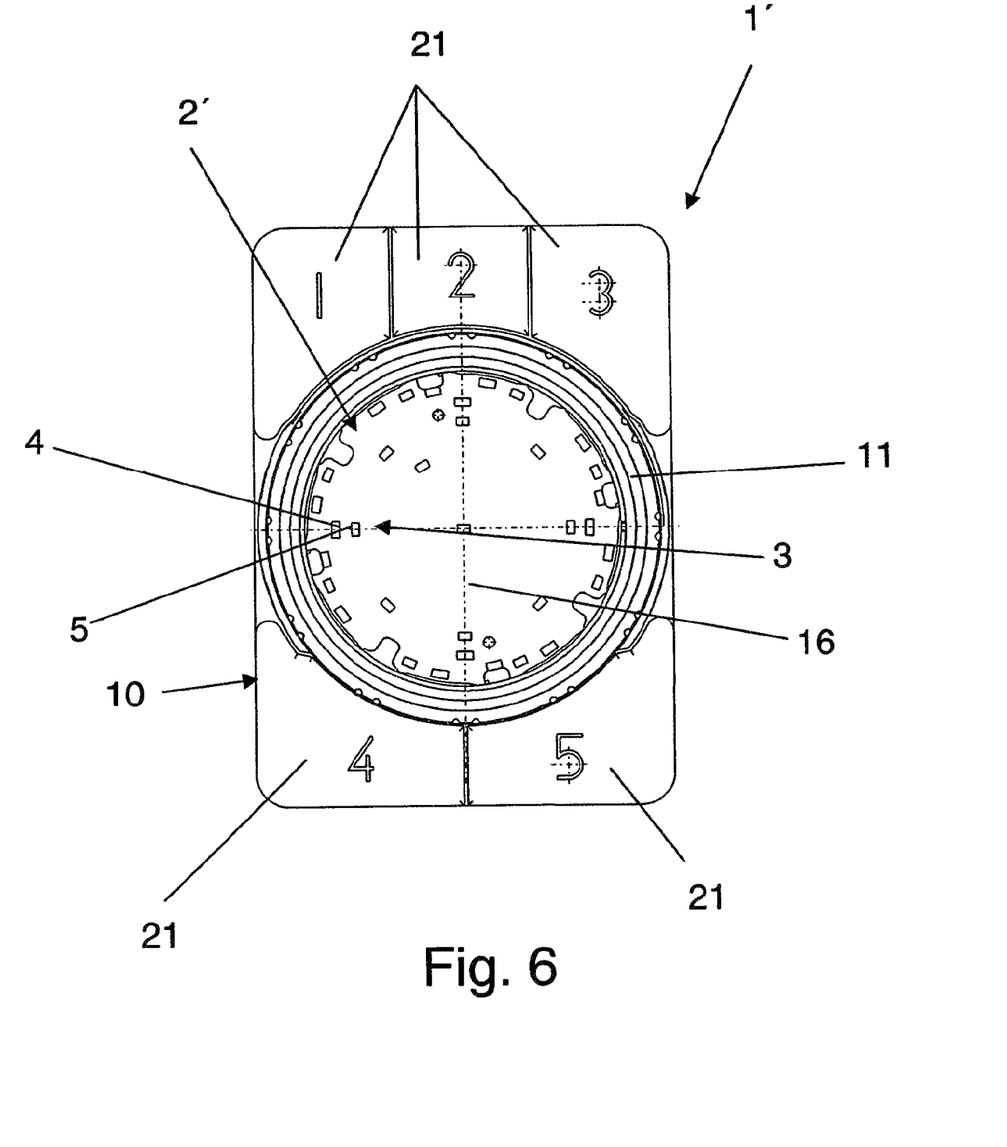
FIG. 6 shows a plan view of the multi-functional operating element from FIG. 3, wherein the sensor face on the activation element is illustrated as transparent.

FIG. 5 shows a section through the activation element 11 and through the upper part of the housing 10. The bearing of the rotatable activation element 11 can be seen in more detail here. Furthermore, the generation of signals for the Enter signal can also be seen in more detail. Finally, according to FIG. 4 or FIG. 5 there is a flexible printed circuit board 16 located in the activation element 11. The printed circuit board 16 serves, inter alia, to accommodate the light emitting diodes 4 and the photodiodes 5, as can be seen in FIG. 6.

As is also apparent from FIG. 3, the multi-functional operating element 1' has further activation elements 21, located in the housing 10, for electrical switches for selecting various further functions. For example, by means of the activation element 21 it is possible to select the display of the menu for the navigation system on a screen in the motor vehicle. The activation elements 21 in turn act on electrical switches, located in the housing 10, for generating the corresponding switch signals.

FIG. 7 shows in more detail the arrangement of the transmitting diodes 4 and receiving diodes 5, in the form of a matrix, for the sensor device 3 in the activation element 11 to enable the activation direction to be detected by the user. Finally, with such an arrangement it is also possible to implement a "horizontal slider" as an operating element, as can be seen in the basic outline on the left in FIG. 7.

It is appropriate that the optical radiation 6 has a wavelength which is not in the range of the light which is visible to the human eye. In particular, the optical radiation 6 can be infrared radiation, wherein the transmitting diode 4 is then composed of an infrared (IR) light emitting diode, and the receiving diode 5 is composed of an infrared (IR) photo diode. The sensor face 2 which is shown in FIG. 1 is configured so as to be substantially transparent to the optical radiation 6 and substantially nontransparent to visible light. As a result, although the optical radiation 6 which is emitted by the sensor device 3 for the functionality of the operating device 1 can penetrate the sensor face 2, and the optical radiation 6 which is reflected, for example, at the finger 7 can in turn be received by the sensor device 3, on the other hand the sensor face 2 is nontransparent to the human eye, as a result of which the activation element 11 can be made completely in accordance with the design prescriptions for the operating device 1.

In particular it is appropriate that the sensor face 2 is configured from a first plastic layer which transmits light and a second layer which does not transmit light but transmits infrared (IR). Such a sensor face 2 can be manufactured as a two-component (2C) part using an injection molding method. The label 2' for the activation element 11 can be configured as a two-component (2C) part in this way. In the case of the label 2', the layer which transmits infrared but is nontransparent to the human eye is arranged over a transparent polycarbonate layer. Likewise, the light guide 12 for the corona illumination and the label 2' can be configured as a 2C part. Insofar as is necessary, the sensor face 2, 2' can have regions which transmit visible light and have the purpose of displaying symbols, functional displays or the like, which is appropriate, for example, for the direction arrows 22 shown in FIG. 4.

The invention is not restricted to the exemplary embodiments which have been described and illustrated. Instead it also comprises all the expert developments within the scope of the invention defined by the patent claims. It is therefore possible for the invention to be used not only for all the operating elements in the motor vehicle but also for other devices, for example domestic appliances, machine tools, computer controllers or the like.

LIST OF REFERENCE NUMBERS

1: Operating device
1': Multi-functional operating element
2: Sensor face
2': Label
3: Sensor device
4: Light emitting diode/transmitting diode
5: Photodiode/receiving diode
6: Optical radiation
7: Finger
8: Hand
9: Electronic system
10: Housing
11: Activation element
12: Light guide
13: Guide part
14: Chrome ring
15: Shaft
16: Printed circuit board
17: Switching mat/switch element
18: Guide disk
19: Anti-rotation means
20: Disk
21: Activation element
22: Direction arrow (on label)

We claim:

1. An operating device comprising a movable activation element for activating at least one switch element for generating a switch signal, a sensor face and an optical reflection sensor device that has at least one light emitting diode and at least one photodiode for optical radiation, wherein a signal is generated when the sensor face is approached or touched by a user, and wherein the sensor face is arranged on the activation element, wherein the sensor face is configured as a label made of a first plastic layer which transmits light, and a second layer which does not transmit light and transmits infrared radiation, and wherein the label is manufactured as a two-component part.

2. The operating device as claimed in claim 1, wherein the at least one light emitting diode and the at least one photodiode are a plurality of light emitting diodes and photodiodes that are arranged in a matrix.

3. The operating device as claimed in claim 1, wherein the sensor face is arranged on the activation element such that a direction signal is generated in the manner of a wind rose by correspondingly operating the sensor face on the activation element, and wherein the activation element is moved by at least one of rotating and pressing for additional operating functions, and wherein the activation element for the additional operating function acts on the switch element in order to generate the switch signal.

4. The operating device as claimed in claim 1, further comprising a housing in which the activation element is movably mounted such that the activation element projects out of the housing in order to be operated by the user, and said operating device further comprises additional activation elements located on the housing for electrical switches.

5. The operating device as claimed in claim 1, wherein the plurality of light emitting diodes and photodiodes are located on a printed circuit board, and the printed circuit board is arranged in the activation element.

6. The operating device as claimed in claim 1, wherein the optical reflection sensor device has at least one light emitting diode and at least one photodiode for optical radiation, such that a signal is generated when the sensor face is approached or touched by a user, wherein the optical radiation has a wavelength which is not in the range of the light which is visible to the human eye, and wherein the sensor face is substantially transparent to the optical radiation and substantially nontransparent to visible light.

7. The operating device as claimed in claim 6, wherein the optical radiation is infrared radiation.

8. The operating device as claimed in claim 7, wherein the optical reflection sensor device has at least one infrared light emitting diode and at least one infrared photodiode.

9. The operating device as claimed in claim 1, wherein the sensor face has regions which transmit visible light for displaying symbols and functional displays.

10. An operating device comprising a sensor face and an optical reflection sensor device that has at least one light emitting diode and at least one photodiode for optical radiation, wherein a signal is generated when the sensor face is approached or touched by a user, wherein the optical radiation has a wavelength which is not in the range of the light which is visible to the human eye, wherein the sensor face is configured as a label made of a first layer which is transparent to visible light and a second layer which is transparent to the optical radiation and nontransparent to visible light, and wherein the optical radiation is infrared radiation.

* * * * *

UNITED STATES PATENT AND TRADEMARK OFFICE
CERTIFICATE OF CORRECTION

| | | |
|---|---|---|
| PATENT NO. | : 8,772,721 B2 | Page 1 of 1 |
| APPLICATION NO. | : 13/656950 | |
| DATED | : July 8, 2014 | |
| INVENTOR(S) | : Hasselbrinck et al. | |

It is certified that error appears in the above-identified patent and that said Letters Patent is hereby corrected as shown below:

On the Title Page, Item [72] First Inventor's City

Please correct: "Spaichinigen (DE);" to -- Spaichingen (DE); --

Signed and Sealed this
Eleventh Day of November, 2014

Michelle K. Lee
*Deputy Director of the United States Patent and Trademark Office*